US012454428B2

(12) United States Patent
Hasegawa

(10) Patent No.: US 12,454,428 B2

(45) Date of Patent: Oct. 28, 2025

(54) IMAGE FORMING APPARATUS

(71) Applicant: SHARP KABUSHIKI KAISHA, Sakai (JP)

(72) Inventor: Naoki Hasegawa, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 159 days.

(21) Appl. No.: 18/099,547

(22) Filed: Jan. 20, 2023

(65) Prior Publication Data

US 2023/0234796 A1 Jul. 27, 2023

(30) Foreign Application Priority Data

Jan. 27, 2022 (JP) ................................ 2022-011090

(51) Int. Cl.

| | |
|---|---|
| ***B65H 7/06*** | (2006.01) |
| ***B65H 1/26*** | (2006.01) |
| ***B65H 7/02*** | (2006.01) |
| ***B65H 7/20*** | (2006.01) |
| ***G03G 15/00*** | (2006.01) |

(52) U.S. Cl.

CPC ............... *B65H 7/06* (2013.01); *B65H 1/266* (2013.01); *B65H 7/02* (2013.01); *B65H 7/20* (2013.01); *G03G 15/6502* (2013.01); *G03G 15/70* (2013.01); *B65H 2220/03* (2013.01)

(58) Field of Classification Search

CPC . B65H 1/14; B65H 1/266; B65H 7/06; B65H 2511/15; B65H 2511/417; B65H 2511/52; B65H 2551/20; B65H 2551/21; G03G 15/6502; G03G 15/70

See application file for complete search history.

(56) References Cited

U.S. PATENT DOCUMENTS

2011/0260391 A1* 10/2011 Sugimoto ................ B65H 1/14 271/265.01

2015/0115522 A1* 4/2015 Kosaka .................... B65H 7/04 271/153

(Continued)

FOREIGN PATENT DOCUMENTS

JP S6123035 A 1/1986

JP 2013-245040 A 12/2013

(Continued)

*Primary Examiner* — Prasad V Gokhale

(74) *Attorney, Agent, or Firm* — ScienBiziP, P.C.

(57) ABSTRACT

In an image forming apparatus, a paper feeder includes: an openable and closable paper feed tray that stores a paper; and an opening and closing detector that detects an open or closed state of a paper feed tray, when determining that abnormality occurs to the paper feed tray that is currently feeding the paper for an image forming device to form an image, an controller determines that the abnormality is caused by failure of the paper feed tray, and executes predetermined first abnormality processing, and when determining that the abnormality occurs to the paper feed tray at the time when the opening and closing detector detects that the paper feed tray is brought into a closed state from an open state, the controller determines that the abnormality is caused by storage failure of the paper stored in the paper feed tray, and executes predetermined second abnormality processing.

2 Claims, 13 Drawing Sheets

(56) References Cited

U.S. PATENT DOCUMENTS

| | | | | |
|---|---|---|---|---|
| 2015/0246785 | A1* | 9/2015 | Adachi | G03G 15/6502 271/262 |
| 2017/0068197 | A1* | 3/2017 | Kai | G03G 15/5062 |
| 2022/0380156 | A1* | 12/2022 | Harada | B65H 7/02 |

FOREIGN PATENT DOCUMENTS

| | | | |
|---|---|---|---|
| JP | 2019-147661 | A | 9/2019 |
| JP | 2020045209 | A | 3/2020 |

* cited by examiner

IMAGE FORMING APPARATUS

CROSS-REFERENCE TO RELATED APPLICATION

The present application claims priority from Japanese Application JP2022-011090, the content to which is hereby incorporated by reference into this application.

BACKGROUND OF THE INVENTION

1. Field of the Invention

The present disclosure relates to an image forming apparatus and, more particularly, relates to an image forming apparatus that has a paper feed error detection function to detect a paper feed error of paper.

2. Description of the Related Art

In an image forming apparatus such as a multifunction peripheral, it has been known that, after paper is stored in a paper feed tray, a lift plate is driven by a lifting motor to lift (lift up) a top of the paper to a predetermined paper-feedable position.

A lift-up error that the paper is not normally lifted to the predetermined paper-feedable position after the paper feed tray is set possibly occurs to the image forming apparatus having such a lift-up tray, depending on a storage state of the paper in the paper feed tray such as that a user sets a paper guide in the paper feed tray more tightly than necessary or that sheets of the paper in uneven thicknesses are set.

The following invention of the image forming apparatus has conventionally been known to solve the problem caused by such paper storage failure. In the image forming apparatus, when such insufficient lifting occurs that arrival of a top sheet of the paper at the paper-feedable position cannot be recognized even after a lifting mechanism lifts the paper feed tray for a prescribed period, a notification device notifies the user of a first message to set a paper setting direction to a reverse direction from a paper transport direction.

SUMMARY OF THE INVENTION

However, the lift-up error is not only caused by the paper storage failure in the paper feed tray but is also caused by failure of the lifting mechanism such as the lifting motor.

When the lift-up error is caused by the paper storage failure in the paper feed tray, such an error may be resolved by urging the user to reset the paper. Meanwhile, when the lift-up error is caused by the failure of the lifting mechanism, the error is not resolved by resetting of the paper and requires a repair service.

An aspect of the present disclosure has been made in view of such a problem and therefore provides an image forming apparatus capable of executing appropriate error handling processing according to a situation where an error occurs to a paper feed tray.

An aspect of the present disclosure provides an image forming apparatus that includes: a paper feeder that feeds paper for image formation; an image forming device that forms an image on the paper on the basis of image data when accepting a print command of the image data from a user; and a controller that controls the paper feeder and the image forming device. The paper feeder includes: an openable and closable paper feed tray that stores the paper; and an opening and closing detector that detects an open or closed state of the paper feed tray. When determining that abnormality occurs to the paper feed tray that is currently feeding the paper for the image forming device to form the image, the controller determines that the abnormality is caused by failure of the paper feed tray, and executes predetermined first abnormality processing. When determining that the abnormality occurs to the paper feed tray at the time when the opening and closing detector detects that the paper feed tray is brought into the closed state from the open state, the controller determines that the abnormality is caused by storage failure of the paper stored in the paper feed tray, and executes predetermined second abnormality processing.

According to the aspect of the present disclosure, it is possible to provide the imaging forming apparatus capable of executing appropriate error handling processing by determining whether an error of the paper feed tray is caused by the failure of the paper feed tray or the paper storage failure according to a situation at the time when the error occurs.

BRIEF DESCRIPTION OF THE DRAWINGS

FIG. 4A is a view of a state where a lift plate is lowered to the lowest point, and FIG. 4B is a view of a state where paper is lifted to a paper feedable position by the lift plate.

DETAILED DESCRIPTION OF THE INVENTION

Figure 1:
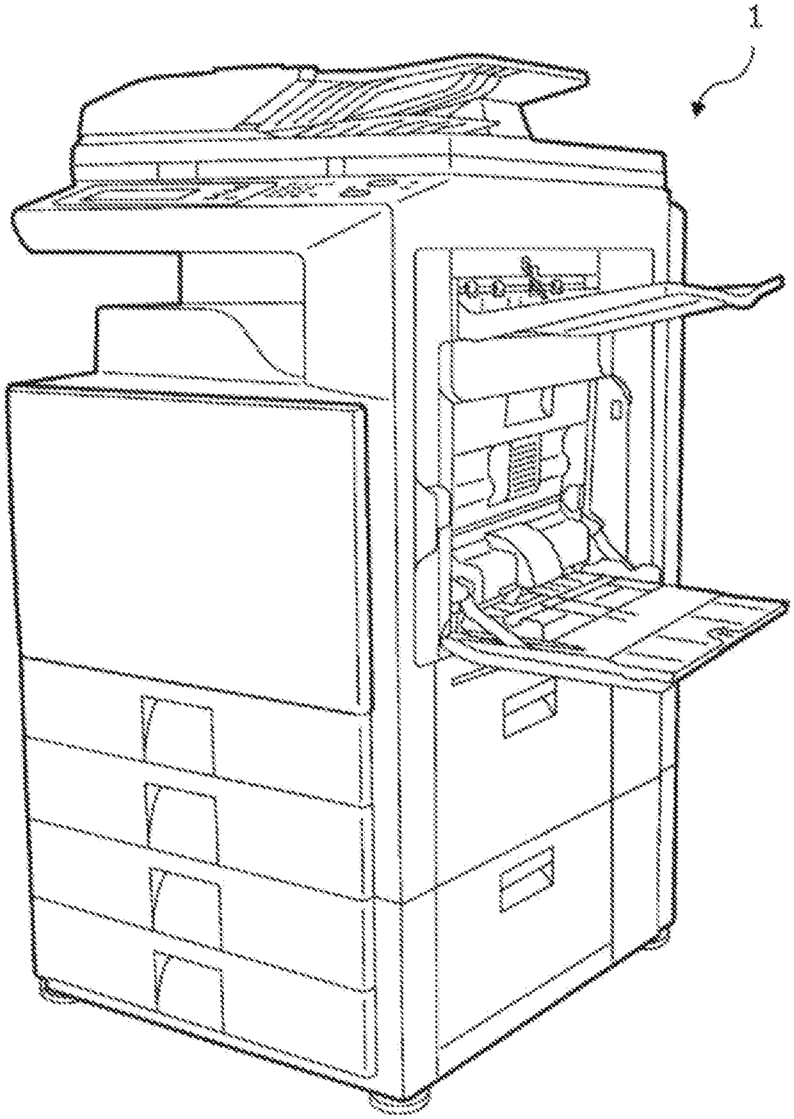
FIG. 1 is a perspective view illustrating external appearance of a digital multifunction peripheral according to an aspect of the present disclosure.

In the aspect of the present disclosure, the number of the "openable and closable paper feed tray that stores the paper" is not limited to one, and a plurality of the paper feed trays storing the same or different types of the paper may be provided.

A description will further be made on preferred aspects of the present disclosure.

(2) In the image forming apparatus according to the aspect of the present disclosure, as the first abnormality processing, the controller may cause the display to show a message that the paper feed tray has to be repaired, and as the second abnormality processing, the controller may cause the display to show a message that a storage state of the paper stored in the paper feed tray has to be checked.

With such a configuration, in the case where an error occurs to the paper feed tray that is currently feeding the paper, the user is notified that the paper feed tray has to be repaired. Meanwhile, in the case where the error occurs to the paper feed tray that is not feeding the paper at the time when the opening and closing detector detects that the paper feed tray is brought into the closed state from the open state, the user is notified to check the storage state of the paper by opening the paper feed tray. In this way, it is possible to provide the image forming apparatus capable of executing the appropriate error handling processing according to the situation at the time when the error occurs to the paper feed tray.

(3) In the image forming apparatus according to the aspect of the present disclosure, the paper feeder further includes: a lifting drive device that lifts up one end of the paper stored in the paper feed tray; and a paper upper surface detector detecting that an upper surface of the one end of the paper is lifted up to a predetermined paper-feedable position. In the case where, after the paper upper surface detector detects that the upper surface of the one end of the paper is lifted up to the paper-feedable position, the paper upper surface detector no longer detects that the upper surface of the one end of the paper is lifted up to the paper-feedable position in the paper feed tray that is currently feeding the paper for the image forming device to form the image, the controller may execute the first abnormality processing. Meanwhile, in the case where, when the opening and closing detector detects that the paper feed tray is brought into the closed state from the open state, the controller causes the lifting drive device to lift up the one end of the paper that is stored in the paper feed tray, but the paper upper surface detector does not detect that the upper surface of the one end of the paper is lifted up to the paper-feedable position in a predetermined elapsed period, the controller may execute the second abnormality processing.

With such a configuration, in the case where the paper upper surface detector no longer detects that the upper surface of the one end of the paper is lifted up to the paper-feedable position in the paper feed tray that is currently feeding the paper, it is determined that the paper feed tray fails, and the user is notified that the paper feed tray has to be repaired. Meanwhile, in the case where, after the opening and closing detector detects that the paper feed tray is brought into the closed state from the open state, the paper upper surface detector does not detect that the upper surface of the one end of the paper is lifted up to the paper-feedable position in the paper feed tray, the user is notified to open the paper feed tray and check the storage state of the paper. In this way, it is possible to provide the image forming apparatus capable of executing the appropriate error handling processing according to the situation at the time when the error occurs to the paper feed tray.

A further detailed description will hereinafter be made on the aspect of the present disclosure with reference to the drawings. The following description is illustrative in all respects and should not be construed to limit the present disclosure.

First Embodiment

A description will be made on an overview of a digital multifunction peripheral 1 as an example of the image forming apparatus in the present disclosure with reference to FIG. 1 to FIG. 4.

FIG. 1 is a perspective view illustrating external appearance of the digital multifunction peripheral 1 according to the aspect of the present disclosure.

The digital multifunction peripheral 1 is an apparatus that has a reproduction function, a scanner function, and a facsimile function, digitally processes image data read from a document, and outputs the digitally-processed image data.

Figure 2:
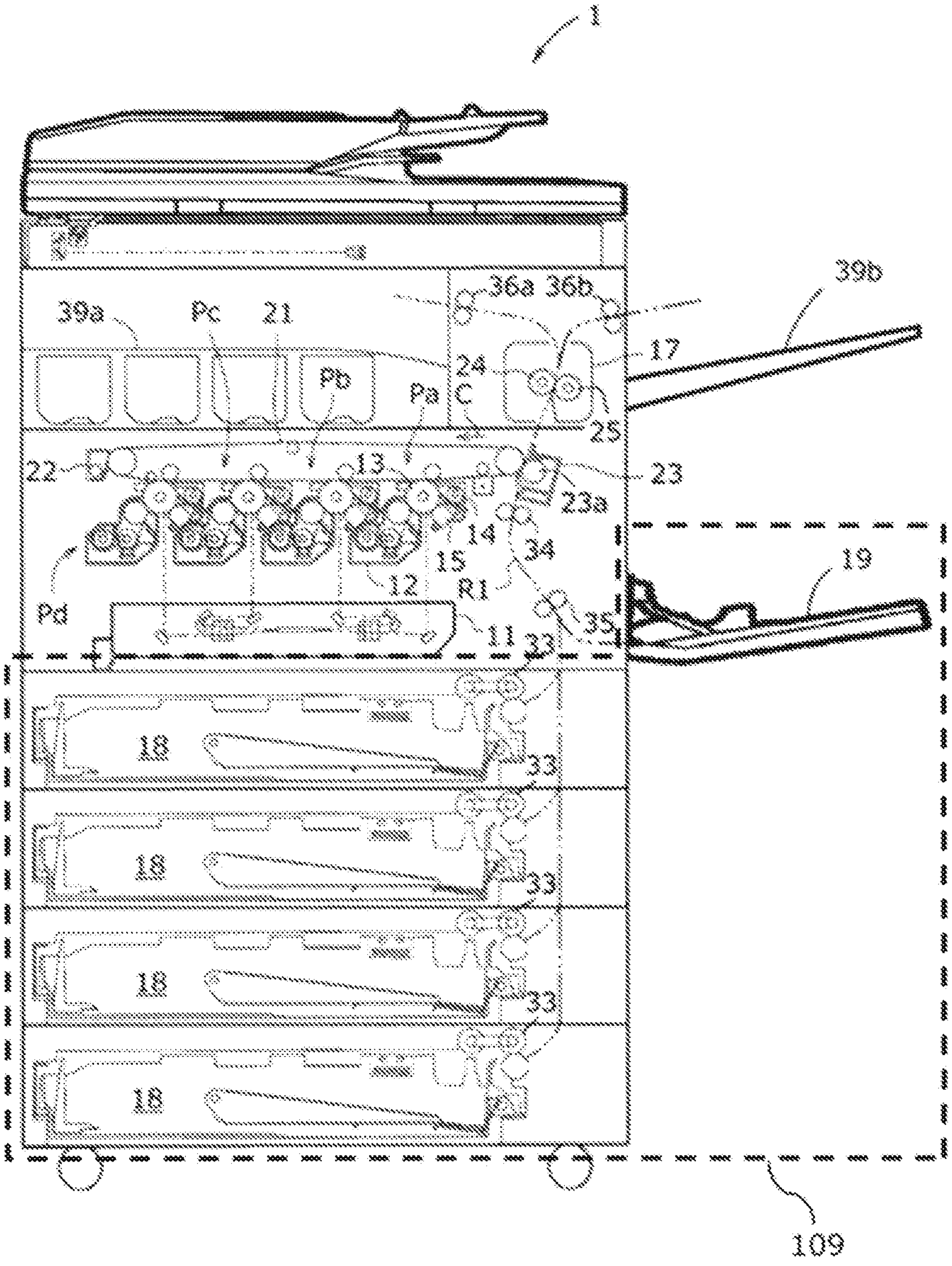
FIG. 2 is a cross-sectional view illustrating an internal configuration of the digital multifunction peripheral illustrated in FIG. 1.

As illustrated in FIG. 2, the digital multifunction peripheral 1 in a first embodiment includes a paper feeder 109 that has four paper feed trays 18.

The digital multifunction peripheral 1 has, as a print mode, a copy (reproduction) function, a print function, and a FAX function. A controller 100 (FIG. 3) selects a printing function of the digital multifunction peripheral 1 that corresponds to an operation input on an operation panel 108 (FIG. 3) or a received print job from an external device (not illustrated) such as a personal computer (PC).

Internal Configuration of Digital Multifunction Peripheral 1

Next, a brief description will be made on an internal configuration of the digital multifunction peripheral 1 with reference to FIG. 2.

FIG. 2 is a cross-sectional view illustrating the internal configuration of the digital multifunction peripheral 1 illustrated in FIG. 1.

In the digital multifunction peripheral 1, a color image using black (K), cyan (C), magenta (M), and yellow (Y) colors is printed on printing paper (hereinafter also simply referred to as "paper 31").

Alternatively, a monochrome image using a single color (for example, black) is printed on the paper 31.

Thus, four each of developing devices 12, photoconductor drums 13, drum cleaners 14, chargers 15, and the like are provided.

In order to form four types of toner images corresponding to the respective colors, each group of the developing device 12, the photoconductor drum 13, the drum cleaner 14, and the charger 15 constitutes one of four image stations Pa, Pb, Pc, Pd in a manner to correspond to respective one of black, cyan, magenta, and yellow.

In any of the image stations Pa, Pb, Pc, Pd, the toner image is formed as follows.

The drum cleaner 14 removes and collects residual toner on a surface of the photoconductor drum 13.

Thereafter, the charger 15 uniformly charges the surface of the photoconductor drum 13 to a predetermined potential.
Then, an optical scanner 11 exposes the uniformly-charged surface to form an electrostatic latent image on the surface.
Thereafter, the developing device 12 develops the electrostatic latent image. In this way, the toner image in each of the colors is formed on the surface of the respective photoconductor drum 13.

An intermediate transfer belt 21 moves rotationally in an arrow direction C.
A belt cleaner 22 removes and collects the residual toner on the rotationally-moving intermediate transfer belt 21.
The toner images in the colors on the surfaces of the photoconductor drums 13 are sequentially transferred and superimposed onto the intermediate transfer belt 21. In this way, the color toner image is formed on the intermediate transfer belt 21.

The paper 31 is pulled out of one of the four paper feed trays 18 in the paper feeder 109 by a pickup roller 33, and is then fed to a secondary transferer 23 via a paper transport path R1.
Alternatively, the paper 31 is fed from a manual feed tray 19 by the pickup roller 33, which is not illustrated, and is then fed to the secondary transferer 23 via the paper transport path R1.

A PS roller 34 is arranged in the paper transport path R1.
The PS roller 34 stops the paper 31 once and align a leading edge of the paper 31.
A paper feed roller 35 that facilitates feeding of the paper 31, and the like are also arranged therein.
After stopping the paper 31 once, the PS roller 34 transports the paper 31 to a nip area between the intermediate transfer belt 21 and a transfer roller 23*a* at timing that matches transfer timing of the toner image.

The nip area is formed between the transfer roller 23*a* of the secondary transferer 23 and the intermediate transfer belt 21.
When the paper 31 passes the nip area, the color toner image that is formed on a surface of the intermediate transfer belt 21 is transferred to the paper 31.

After passing through the nip area, the paper 31 is sandwiched between a heating roller 24 and a pressure roller 25 in a fuser 17 and is then heated and pressurized.
With such heating and pressurization, the color toner image is fused onto the paper 31.

The paper 31 that has passed through the fuser 17 is discharged to a discharge tray 39*a* or 39*b* through a discharge roller 36*a* or 36*b*, respectively.

A discharge destination of the paper 31 is controlled by the controller 100, which will be described below, and the transport path is switched by an unillustrated switching mechanism such that the paper 31 is guided to one of the discharge trays 39*a*, 39*b*.

The switching mechanism that switches the transport path of the paper 31 is well known in the technical field of the image forming apparatus and thus is not illustrated in detail.

Figure 3:
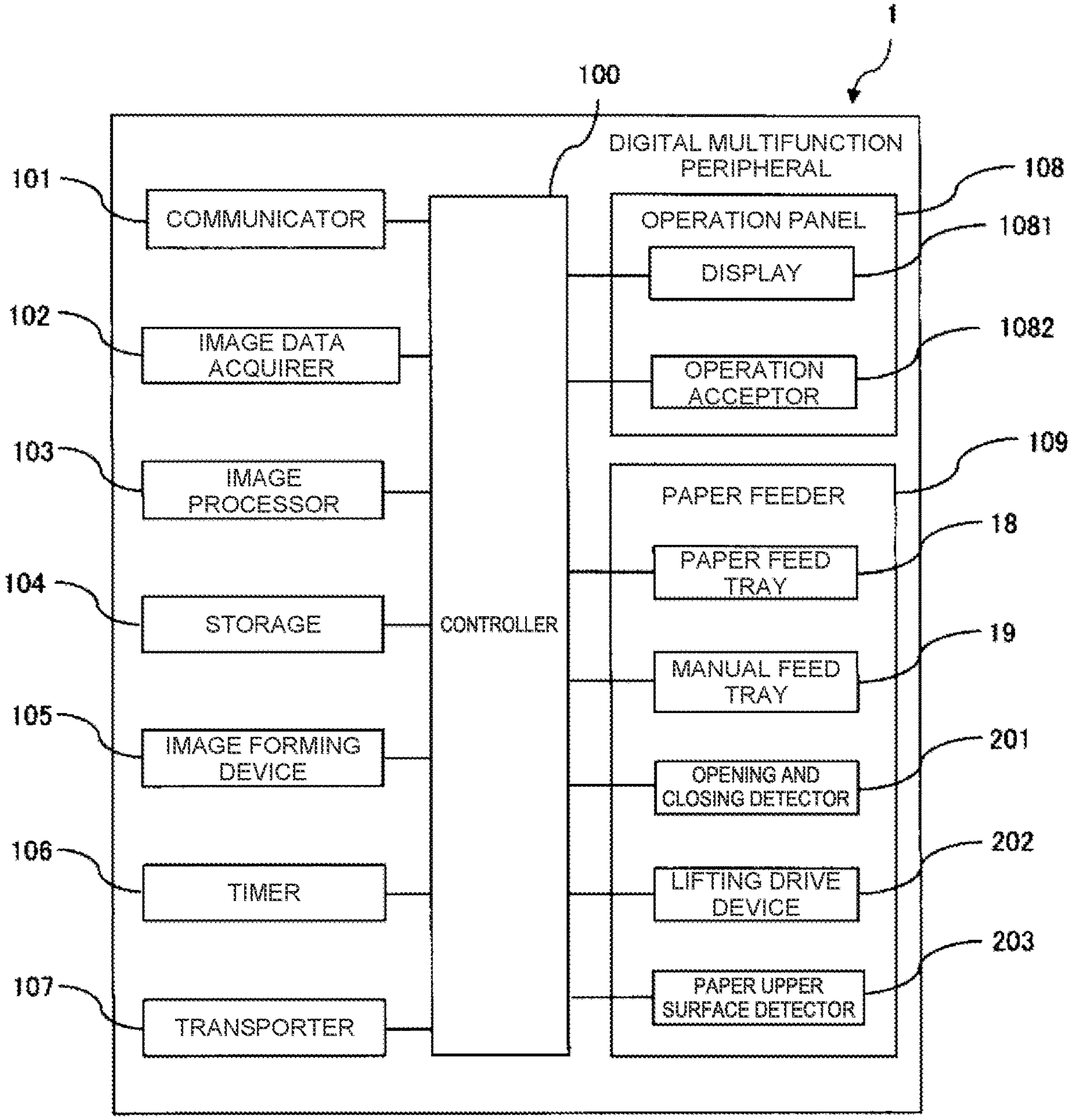
FIG. 3 is a block diagram illustrating a schematic configuration of the digital multifunction peripheral illustrated in FIG. 1.

Next, a description will be made on an electrical configuration of the digital multifunction peripheral 1 with reference to FIG. 3.
FIG. 3 is a block diagram illustrating the electrical configuration of the digital multifunction peripheral 1 illustrated in FIG. 1.

As illustrated in FIG. 3, the digital multifunction machine 1 includes the controller 100, a communicator 101, an image data acquirer 102, an image processor 103, a storage 104, an image forming device 105, a timer 106, a transporter 107, the operation panel 108, and the paper feeder 109.

A description will hereinafter be made on each component of the digital multifunction peripheral 1.

The controller 100 controls the digital multifunction peripheral 1 comprehensively and includes a CPU, random-access memory (RAM), read-only memory (ROM), various interface circuits, and the like.

In order to control entire operation of the digital multifunction peripheral 1, the controller 100 monitors and controls all types of loads such as detection by each sensor, a motor, a clutch, and the operation panel 108.

The communicator 101 is a component that communicates with, via a wired or wireless network, an external information processor, such as a computer or a portable information terminal, and an external facsimile machine so as to exchange various types of data, such as an e-mail and a fax, with these external devices.

The image data acquirer 102 is a component that detects and reads the document placed on a document table or the document transported from a document tray so as to generate the image data.
The image data acquirer 102 is also a component that acquires the image data generated by the external information processor (not illustrated), the external facsimile machine (not illustrated), and the like.

The image processor 103 is a component that executes processing such as scaling of the image data, which is generated or acquired by the image data acquirer 102, in accordance with a command from an operation acceptor 1082 so as to make the image data suitable for output.

The storage 104 is an element or a storage medium that stores necessary information to implement the various functions of the digital multifunction peripheral 1, a control program, and the like. For example, any of the storage mediums including semiconductor elements, such as the ROM and the RAM, a hard disk, flash memory, and an SSD is used as the storage 104.

Here, the program and the data may be held by mutually different devices in such a manner that a hard disk drive constitutes a data holding area while the flash memory constitutes a program holding area.

The image forming device 105 is a component that prints out the image data, which is generated or acquired by the image data acquirer 102 and is processed by the image processor 103, onto the paper 31.

The image forming device 105 is configured to further include electrical components related to the optical scanner 11, the developing devices 12, the photoconductor drums 13, the drum cleaners 14, and the chargers 15, which are illustrated in FIG. 2.
The image forming device 105 is further configured to include electrical components related to the intermediate transfer belt 21, the fuser 17, the paper transport path R1, the paper feeder 109, and the discharge trays 39*a*, 39*b*.

The timer 106 is a component that measures and counts time and acquires time through a built-in clock or the network, for example.

The transporter 107 is a component that transports the paper 31, which is stored in the paper feed tray 18 of the paper feeder 109, the manual feed tray 19, and a document set table, to the image forming device 105, and after printing, discharges the paper 31 to the discharge trays 39*a*, 39*b*.

The operation panel 108 is a unit that includes a liquid crystal display, and includes a display 1081 and the operation acceptor 1082.

The display 1081 is a component that shows various types of information.

The display 1081 is constructed of a CRT display, the liquid crystal display, or an EL display, for example, and is a display device such as a monitor or a line display for an operating system or application software to show electronic data such as a processing state.

The controller 100 causes the display 1081 to show the operation and a state of the digital multifunction peripheral 1.

The operation acceptor 1082 is a component that is constructed of physical operation keys such as a touch panel and a power key and accepts a command from a user.

The paper feeder 109 includes a plurality of the paper feed trays 18, each of which stores the paper 31 to be transported to the image forming device 105.

In the example illustrated in FIG. 1 and FIG. 2, the paper feeder 109 includes the four paper feed trays 18 and the one manual feed tray 19.

The paper feeder 109 includes the paper feed trays 18, the manual feed tray 19, an opening and closing detector 201, a lifting drive device 202, and a paper upper surface detector 203.

The paper feed tray 18 is a tray that stores the paper 31 in a predetermined size and of a predetermined type.

The manual feed tray 19 is a tray in which the paper 31 is stored manually.

The opening and closing detector 201 is a component that detects an open or closed state of the paper feed tray 18.

The lifting drive device 202 is a drive device that lifts a lift plate 181 loaded with the paper 31 by using a lifting motor after plural sheets of the paper 31 are stored in the paper feed tray 18.

Figure 4A:
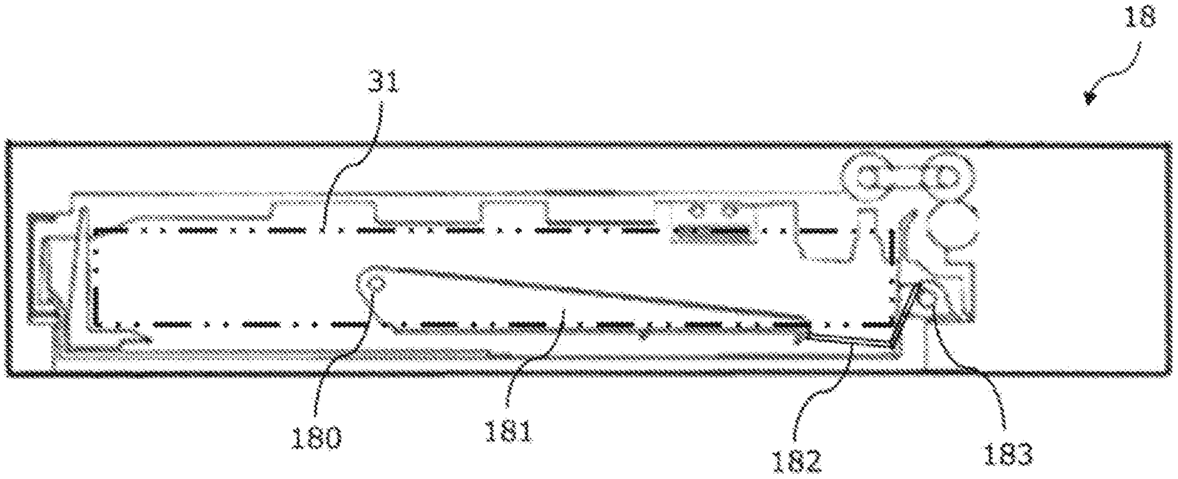
FIG. 4A and FIG. 4B are views, each of which illustrates an internal configuration of a paper feed tray in the digital multifunction peripheral illustrated in FIG. 1.
Figure 4B:
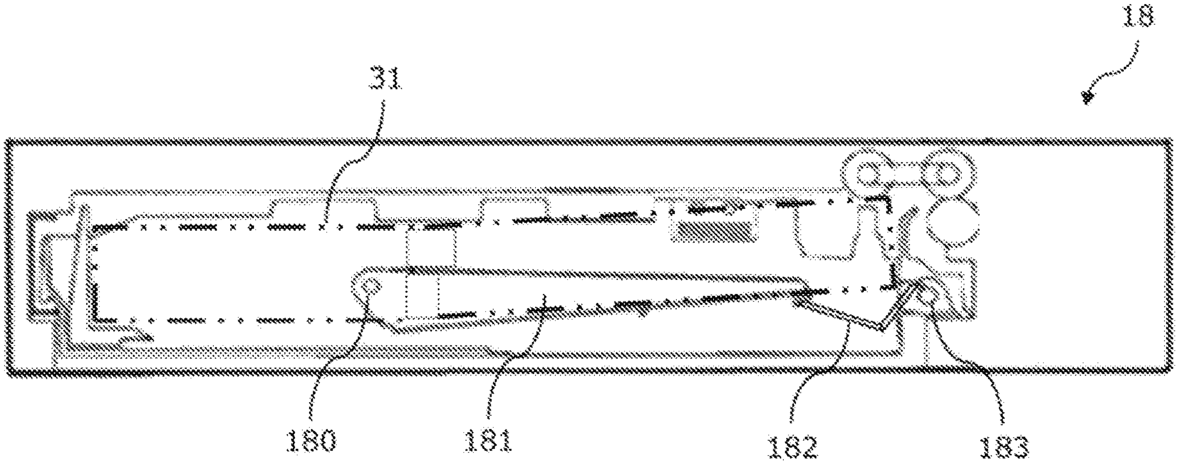

FIG. 4A and FIG. 4B are views, each of which illustrates an internal configuration of the paper feed tray 18 in the digital multifunction peripheral 1 illustrated in FIG. 1.

FIG. 4A is a view of a state where the lift plate 181 is lowered to the lowest point, and FIG. 4B is a view of a state where an upper surface of an end of the paper 31 is lifted by the lift plate 181 to a paper feedable position.

As illustrated in FIG. 4A, immediately after the paper feed tray 18 is closed, the lift plate 181 is in a state of being lowered to the lowest point, and the lift plate 181 is loaded with the plural sheets of the paper 31.

When the paper feed tray 18 is opened, a coupled portion (coupling) between an unillustrated driveshaft and the lifting motor is decoupled, and the lift plate 181 is no longer fixed and is lowered to the lowest point by own weight.

Meanwhile, when the paper feed tray 18 is closed, the above-described coupling is established to allow driving of the lift plate 181.

Then, when the opening and closing detector 201 detects closing of the paper feed tray 18, the controller 100 controls the lifting drive device 202 to rotate a lifting member 182 via a driveshaft 183 and lift (lift up) the lift plate 181 with a support 180 as a fulcrum.

The paper upper surface detector 203 is a component that detects whether the upper surface of the end of the paper 31, which is lifted by the lift plate 181, is located at the predetermined paper-feedable position.

<Overview of Lift-Up Error Determination Processing for Paper Feed Tray 18>

Next, a description will be made on an overview of lift-up error determination processing for the paper feed tray 18 in the digital multifunction peripheral 1 according to the first embodiment of the present disclosure with reference to FIG. 5 to FIG. 11.

FIG. 5 to FIG. 11 are a flowchart illustrating the lift-up error determination processing for the paper feed tray 18 in the digital multifunction peripheral 1 according to the first embodiment of the present disclosure.

It is assumed that the controller 100 executes the lift-up error determination processing for each of the plural paper feed trays 18 independently.

Figure 5:
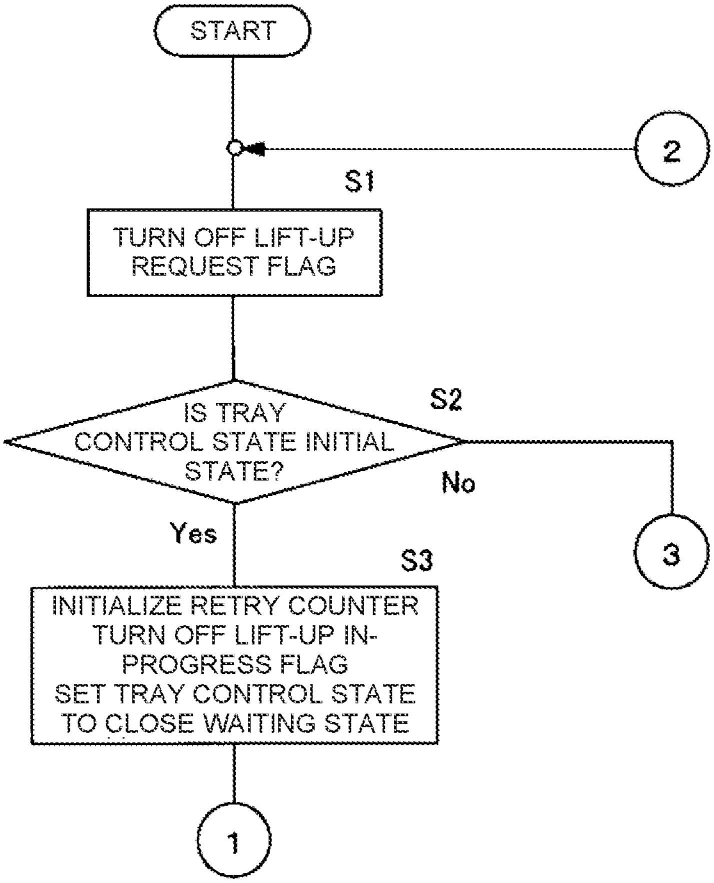
FIG. 5 is a flowchart illustrating lift-up error determination processing for the paper feed tray in the digital multifunction peripheral according to a first embodiment of the present disclosure.

In step S1 illustrated in FIG. 5, the controller 100 turns off a lift-up request flag (step S1).

Here, the lift-up request flag is a flag that is used to determine whether to cause the lifting drive device 202 to lift up the lift plate 181, which is loaded with the paper 31, by using the lifting motor.

More specifically, the lift plate 181 is lifted up when the lift-up request flag is on.

Next, in step S2, the controller 100 determines whether a tray control state is an initial state (step S2).

More specifically, it is assumed that the tray control state is the "initial" state immediately after the user turns on the power of the digital multifunction peripheral 1 and activates the digital multifunction peripheral 1.

Figure 7:
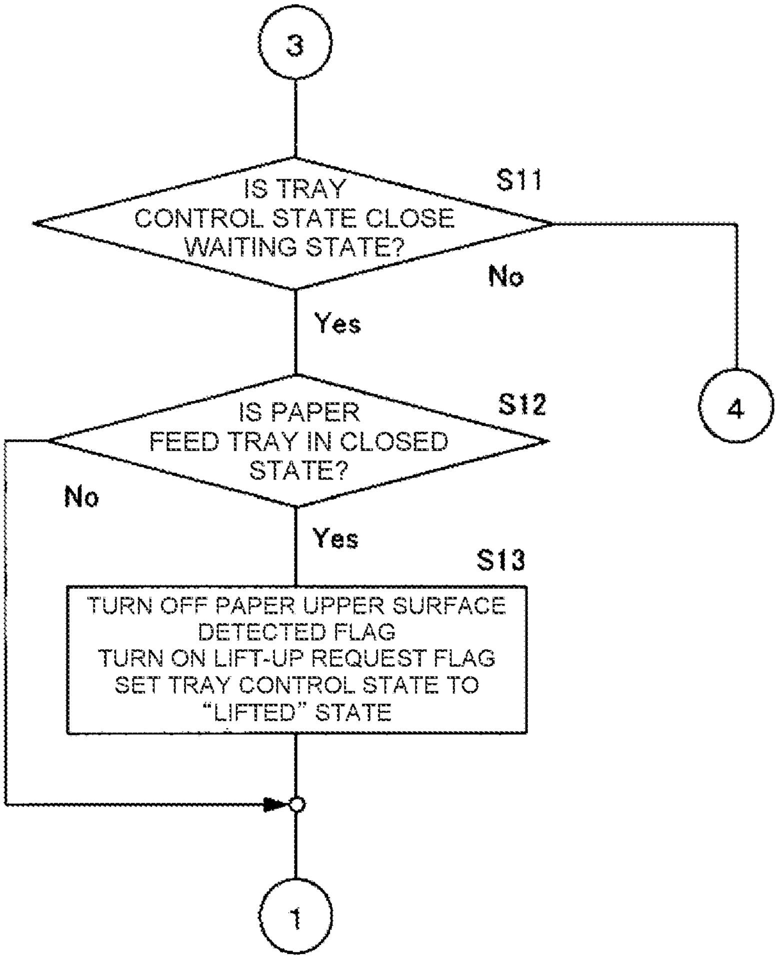
FIG. 7 is a flowchart illustrating the lift-up error determination processing for the paper feed tray in the digital multifunction peripheral according to the first embodiment of the present disclosure.

If the tray control state is not the "initial" state (if the determination in step S2 is No), the controller 100 makes a determination in step S11 illustrated in FIG. 7.

On the other hand, if the tray control state is the "initial" state (if the determination in step S2 is Yes), in step S3, the controller 100 initializes a retry counter to 0, turns off a lift-up in-progress flag, and sets the tray control state to a "close waiting" state (step S3).

Here, the retry counter is a counter that counts the number of times (the number of retries) the user rechecks the paper feed tray 18 for a purpose of improving the paper storage state when the lift-up error caused by the paper storage failure occurs.

The lift-up in-progress flag is a flag that is used to determine whether the lift plate 181 of the paper feed tray 18 is currently lifted up.

Figure 6:
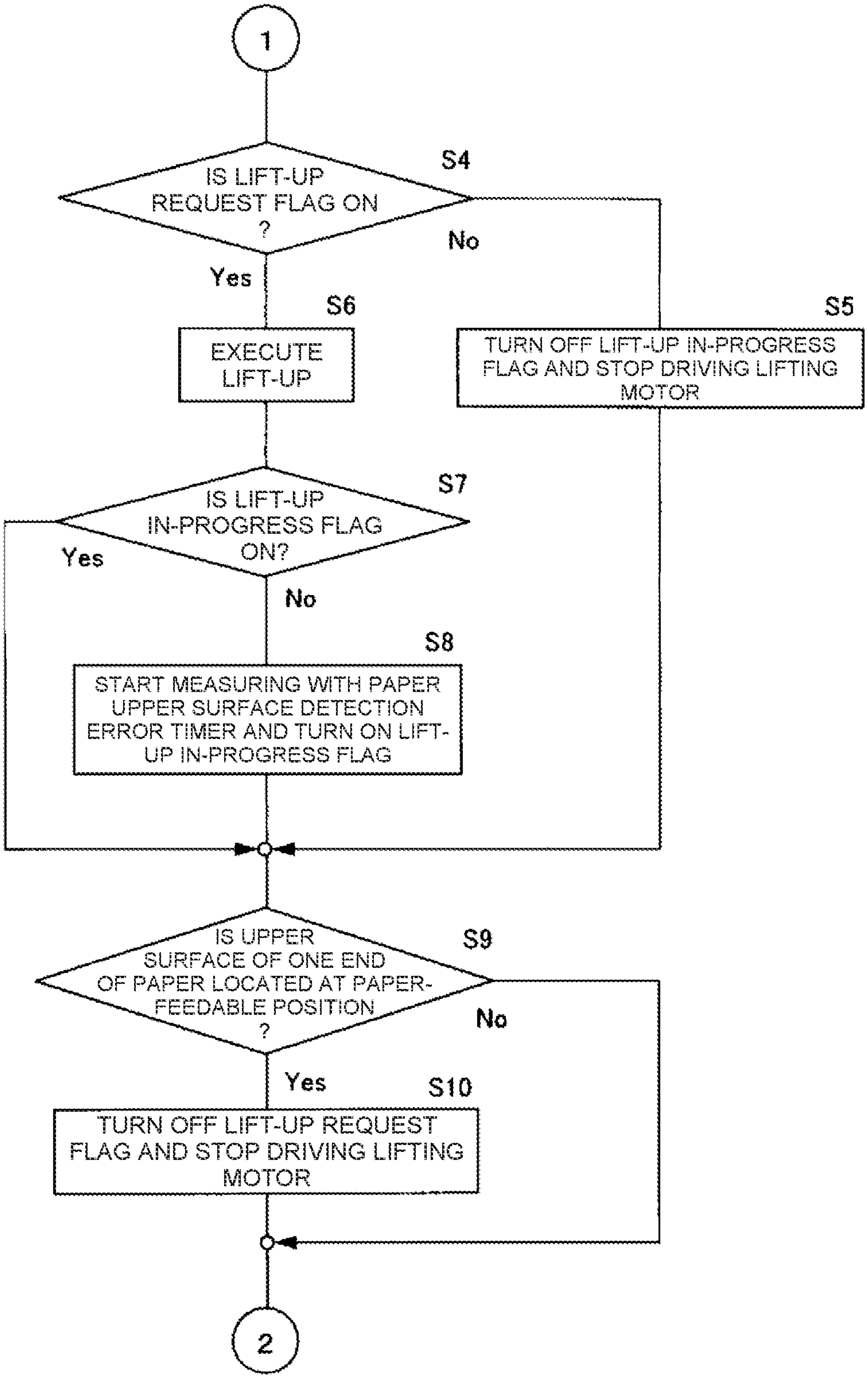
FIG. 6 is a flowchart illustrating the lift-up error determination processing for the paper feed tray in the digital multifunction peripheral according to the first embodiment of the present disclosure.

Next, in step S4 illustrated in FIG. 6, the controller 100 determines whether the lift-up request flag is on (step S4).

If the lift-up request flag is not on (if the determination in step S4 is No), in step S5, the controller 100 turns off the lift-up in-progress flag and causes the lifting drive device 202 to stop driving the lifting motor (step S5).

Thereafter, the controller 100 makes a determination in step S9.

On the other hand, if the lift-up request flag is on (if the determination in step S4 is Yes), in step S6, the controller 100 causes the lifting drive device 202 to drive the lifting motor and to lift up the lift plate 181 of the paper feed tray 18 (step S6).

Next, in step S7, the controller 100 determines whether the lift-up in-progress flag is on (step S7).

If the lift-up in-progress flag is not on (if the determination in step S7 is No), in step S8, the controller 100 causes the timer 106 to start measurement with a paper upper surface detection error timer, and turns on the lift-up in-progress flag.

Thereafter, the controller 100 makes the determination in step S9.

On the other hand, if the lift-up in-progress flag is on (if the determination in step S7 is Yes), in step S9, the controller 100 determines whether the upper surface of the end of the paper 31 is located at the predetermined paper-feedable position (step S9).

If the upper surface of the end of the paper 31 is not located at the paper-feedable position (if the determination in step S9 is No), the processing returns to step S1.

On the other hand, if the upper surface of the end of the paper 31 is located at the paper-feedable position (if the determination in step S9 is Yes), in step S10, the controller 100 turns off the lift-up request flag and causes the lifting drive device 202 to stop driving the lifting motor (step S10).

Thereafter, the processing returns to step S1.

Next, in step S11 illustrated in FIG. 7, the controller 100 determines whether the tray control state is the "close waiting" state (step S11).

Figure 8:
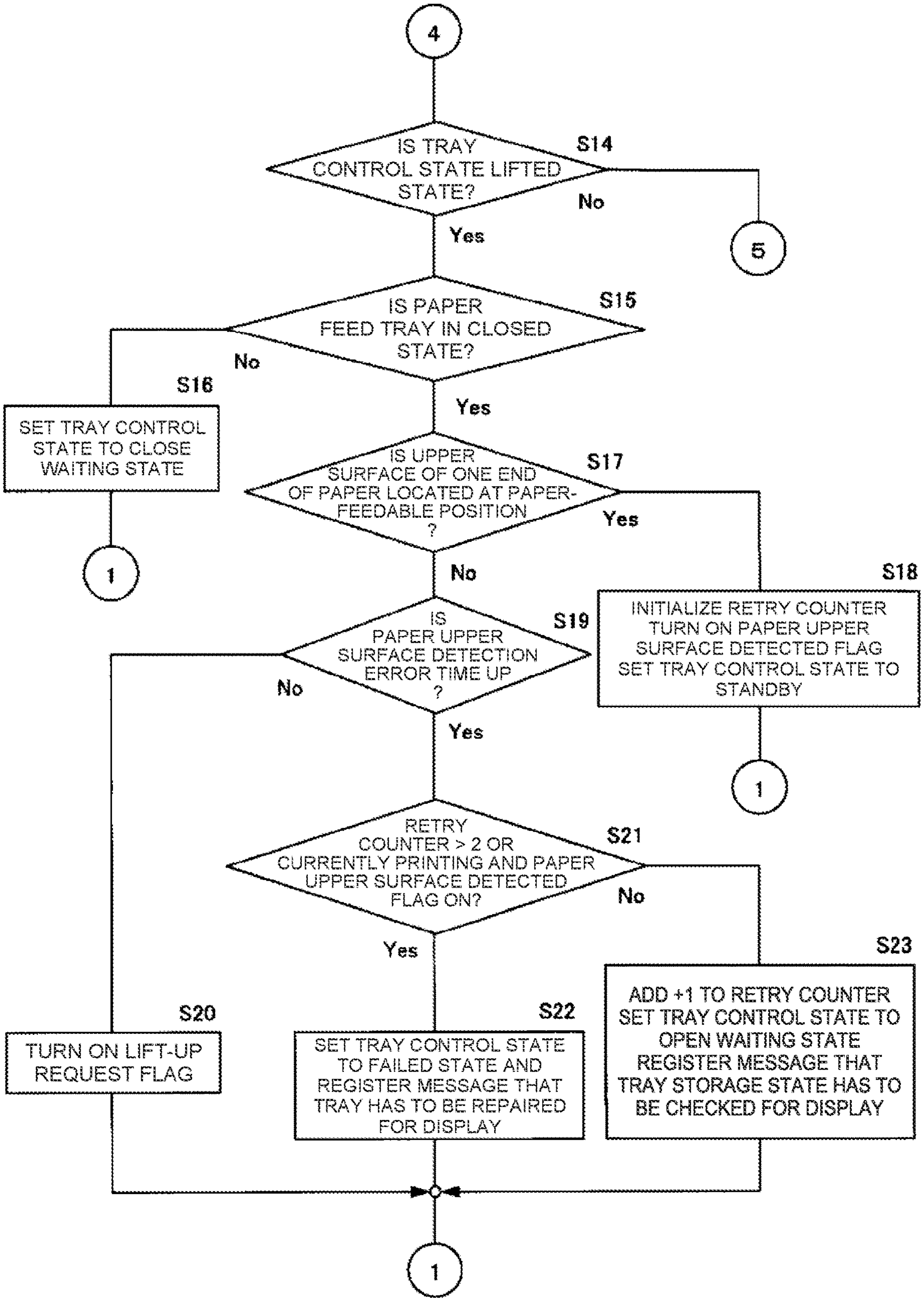
FIG. 8 is a flowchart illustrating the lift-up error determination processing for the paper feed tray in the digital multifunction peripheral according to the first embodiment of the present disclosure.

If the tray control state is not the "close waiting" state, that is, when the paper feed tray 18 is in the closed state (if the determination in step S11 is No), the controller 100 makes a determination in step S14 illustrated in FIG. 8.

On the other hand, if the tray control state is the "close waiting" state, that is, when the paper feed tray 18 is in the open state (if the determination in step S11 is Yes), in step S12, the controller 100 determines whether the paper feed tray 18 is in the closed state on the basis of a detection result by the opening and closing detector 201 (step S12).

If the paper feed tray 18 is in the closed state (if the determination in step S12 is Yes), in step S13, the controller 100 turns off a paper upper surface detected flag, turns on the lift-up request flag, and sets the tray control state to a "lifted" state (step S13).

Thereafter, the processing returns to the determination in step S4.

On the other hand, in step S12, if the paper feed tray 18 is not in the closed state (if the determination in step S12 is No), the processing returns to the determination in step S4.

Next, in step S14 illustrated in FIG. 8, the controller 100 determines whether the tray control state is a "lifted" state (step S14).

Figure 9:
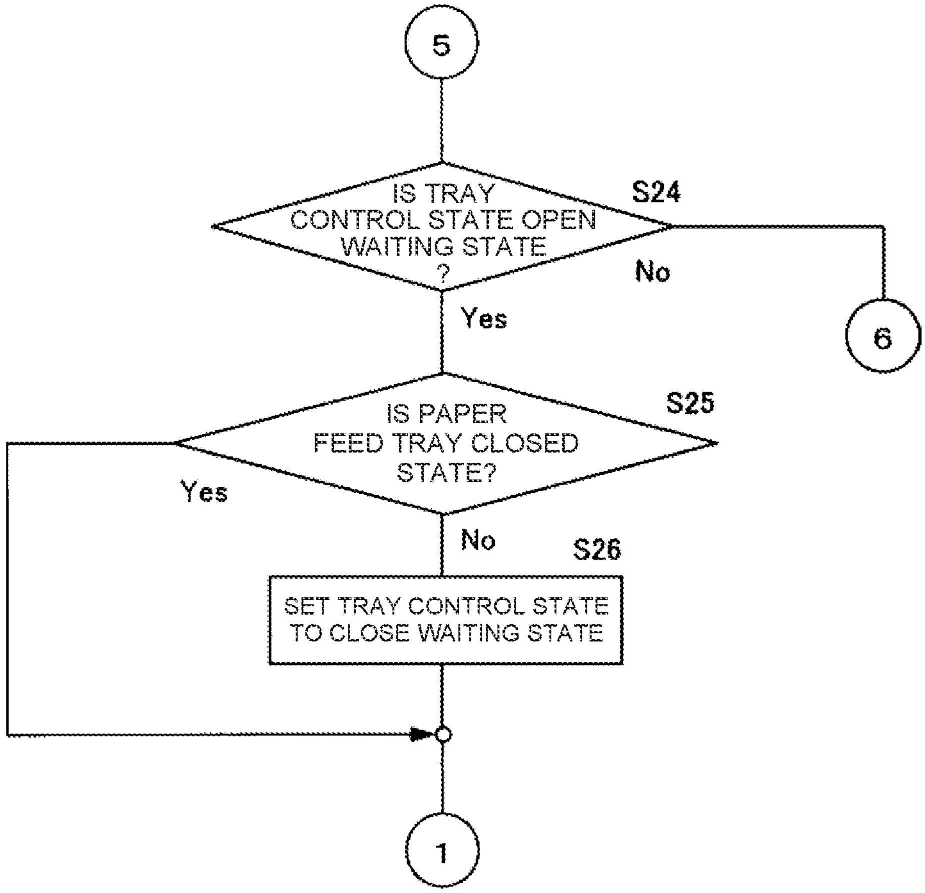
FIG. 9 is a flowchart illustrating the lift-up error determination processing for the paper feed tray in the digital multifunction peripheral according to the first embodiment of the present disclosure.

If the tray control state is not the "lifted" state (if the determination in step S14 is No), the controller 100 makes a determination in step S24 illustrated in FIG. 9.

On the other hand, if the tray control state is the "lifted" state (if the determination in step S14 is Yes), in step S15, the controller 100 determines whether the paper feed tray 18 is in the closed state (step S15).

If the paper feed tray 18 is not in the closed state (if the determination in step S15 is No), in step S16, the controller 100 sets the tray control state to the "close waiting" state (step S16).

Thereafter, the processing returns to the determination in step S4.

On the other hand, if the paper feed tray 18 is in the closed state (if the determination in step S15 is Yes), in step S17, the controller 100 determines whether the upper surface of the end of the paper 31 is located at the predetermined paper-feedable position (step S17).

If the upper surface of the end of the paper 31 is located at the predetermined paper-feedable position (if the determination in step S17 is Yes), in step S18, the controller 100 initializes the retry counter to 0, turns on the paper upper surface detected flag, and sets the tray control state to the "standby" state (step S18).

Thereafter, the processing returns to the determination in step S4.

On the other hand, if the upper surface of the end of the paper 31 is not located at the paper-feedable position (if the determination in step S17 is No), in step S19, the controller 100 determines whether a time for a paper upper surface detection error is up (step S19).

More specifically, in the case where the upper surface of the end of the paper 31 does not reach the paper-feedable position within a predetermined time (for example, 10 seconds) after the lift plate 181 of the paper feed tray 18 starts being lifted up, the controller 100 determines that the time for the paper upper surface detection error is up.

If the time for the paper upper surface detection error is not up (if the determination in step S19 is No), in step S20, the controller 100 turns on the lift-up request flag (step S20).

Thereafter, the processing returns to the determination in step S4.

On the other hand, if the time for the paper upper surface detection error is up (if the determination in step S19 is Yes), in step S21, the controller 100 determines whether any of the following conditions is satisfied. The conditions are that a value of the retry counter is larger than two and that the image forming device 105 is printing and the paper upper surface detected flag is on (step S21).

If any of the conditions that the value of the retry counter is larger than two and that the image forming device 105 is printing and the paper upper surface detected flag is on is satisfied (if the determination in step S21 is Yes), in step S22, the controller 100 sets the tray control state to a "failed" state and registers (hereinafter, registers for display) a message that the paper feed tray 18 has to be repaired in a message display process, which is not illustrated and executed in parallel by the controller 100, in order to cause the display 1081 to show the message (step S22).

The thus-registered message for the display is shown on the display 1081 according to a predetermined display request priority.

Thereafter, the processing returns to the determination in step S4.

On the other hand, if none of the conditions is satisfied (if the determination in step S21 is No), in step S23, the controller 100 adds +1 to the retry counter, sets the tray control state to an "open waiting" state, and registers a message that the storage state of the paper feed tray 18 has to be checked for display (step S23).

As for the display request priority, the "message that the paper feed tray 18 has to be repaired" has a higher priority than the "message that the storage state of the paper feed tray 18 has to be checked".

Accordingly, for example, of the plural paper feed trays 18, in the case where a tray 1 has to be repaired while a storage state of another tray 2 has to be checked at the same time, display of a message that the tray 1 has to be repaired on the display 1081 is prioritized over display of a message that the storage state of the tray 2 has to be checked thereon.

Thereafter, the processing returns to the determination in step S4.

Next, in step S24 illustrated in FIG. 9, the controller 100 determines whether the tray control state is the "open waiting" state (step S24).

Figure 10:
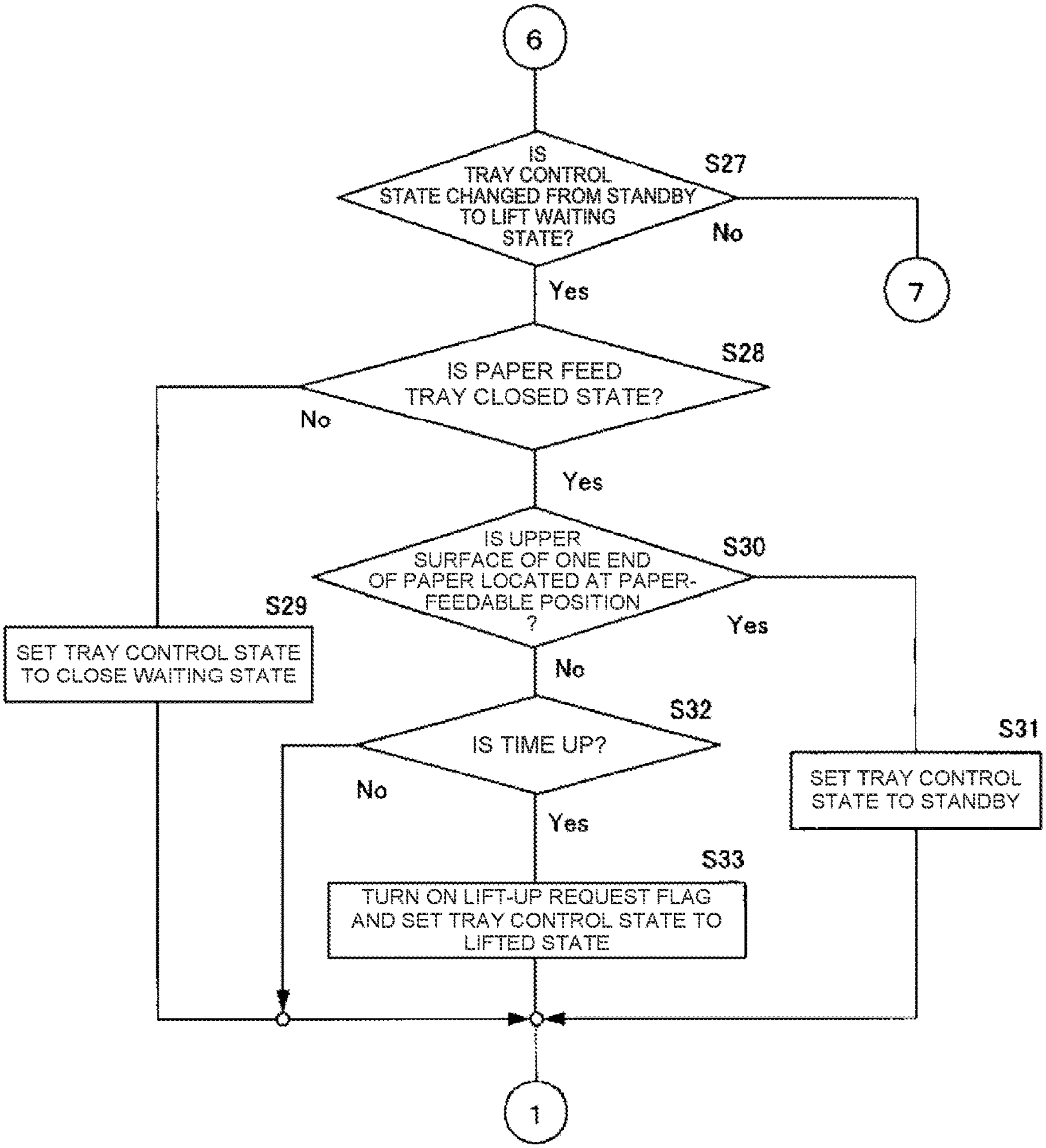
FIG. 10 is a flowchart illustrating the lift-up error determination processing for the paper feed tray in the digital multifunction peripheral according to the first embodiment of the present disclosure.

If the tray control state is not the "open waiting" state (if the determination in step S24 is No), the controller 100 makes a determination in step S27 illustrated in FIG. 10.

On the other hand, if the tray control state is the "open waiting" state (if the determination in step S24 is Yes), in step S25, the controller 100 determines whether the paper feed tray 18 is in the closed state (step S25).

If the paper feed tray 18 is not in the closed state (if the determination in step S25 is No), in step S26, the controller 100 sets the tray control state to the "close waiting" state (step S26).

Thereafter, the processing returns to the determination in step S4.

On the other hand, if the paper feed tray 18 is in the closed state (if the determination in step S25 is Yes), the processing returns to the determination in step S4.

Next, in step S27 illustrated in FIG. 10, the controller 100 determines whether the tray control state is changed from the "standby" state to a "lift waiting" state (step S27).

Figure 11:
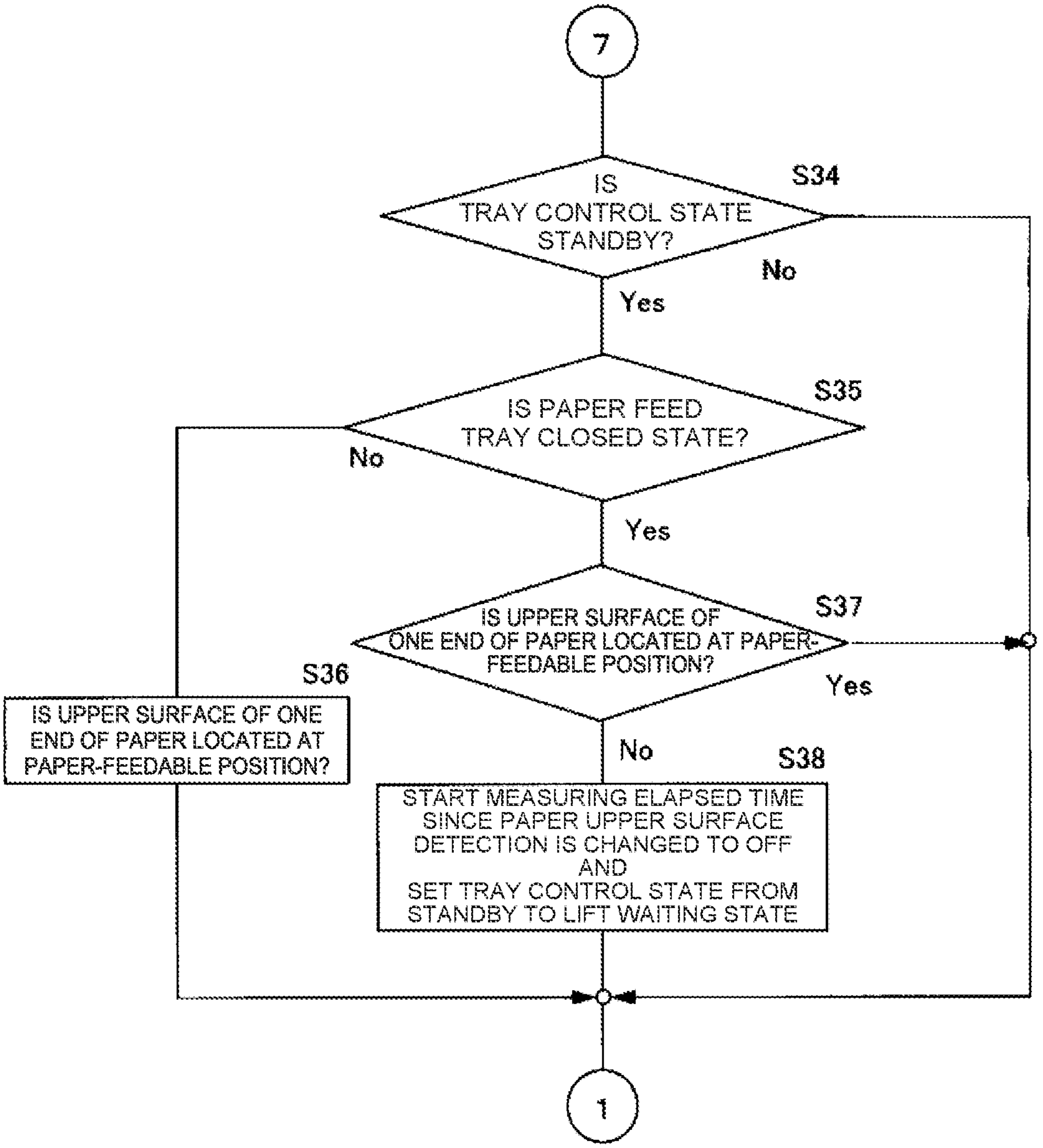
FIG. 11 is a flowchart illustrating the lift-up error determination processing for the paper feed tray in the digital multifunction peripheral according to the first embodiment of the present disclosure.

If the tray control state is not changed from the "standby" state to the "lift waiting" state (if the determination in step S27 is No), the controller 100 makes a determination in step S34 illustrated in FIG. 11.

On the other hand, if the tray control state is changed from the "standby" state to the "lift waiting" state (if the determination in step S27 is Yes), in step S28, the controller 100 determines whether the paper feed tray 18 is in the closed state (step S28).

If the paper feed tray 18 is not in the closed state (if the determination in step S28 is No), in step S29, the controller 100 sets the tray control state to the "close waiting" state (step S29).

Thereafter, the processing returns to the determination in step S4.

On the other hand, if the paper feed tray 18 is in the closed state (if the determination in step S28 is Yes), in step S30, the controller 100 determines whether the upper surface of the end of the paper 31 is located at the paper-feedable position on the basis of a detection result by the paper upper surface detector 203 (step S30).

If the upper surface of the end of the paper 31 is located at the paper-feedable position (if the determination in step S30 is Yes), in step S31, the controller 100 sets the tray control state to the "standby" state (step S31).

Thereafter, the processing returns to the determination in step S4.

On the other hand, if the upper surface of the end of the paper 31 is not located at the paper-feedable position (if the determination in step S30 is No), in step S32, the controller 100 determines whether, in a standby period for the paper upper surface detection, an elapsed period from time at which the paper upper surface detection is changed to be off to time at which lift up is initiated exceeds a predetermined waiting period (for example, 1.2 seconds) (the time is up) (step S32).

If the elapsed period from the time at which the paper upper surface detection is changed to be off is up (if the determination in step S32 is Yes), in step S33, the controller 100 turns on the lift-up request flag and sets the tray control state to the "lifted" state (step S33).

Thereafter, the processing returns to the determination in step S4.

On the other hand, if the elapsed period from the time at which the paper upper surface detection is changed to be off is not up (if the determination in step S32 is No), the processing returns to the determination in step S4.

Next, in step S34 illustrated in FIG. 11, the controller 100 determines whether the tray control state is the "standby" state (step S34).

If the tray control state is not the "standby" state (if the determination in step S34 is No), the processing returns to the determination in step S4.

On the other hand, if the tray control state is the "standby" state (if the determination in step S34 is Yes), in step S35, the controller 100 determines whether the paper feed tray 18 is in the closed state (step S35).

If the paper feed tray 18 is not in the closed state (if the determination in step S35 is No), in step S36, the controller 100 sets the tray control state to the "close waiting" state (step S36).

Thereafter, the processing returns to the determination in step S4.

On the other hand, if the paper feed tray 18 is in the closed state (if the determination in step S35 is Yes), in step S37, the controller 100 determines whether the upper surface of the end of the paper 31 is located at the paper-feedable position on the basis of the detection result by the paper upper surface detector 203 (step S37).

If the upper surface of the end of the paper 31 is located at the paper-feedable position (if the determination in step S37 is Yes), the processing returns to the determination in step S4.

On the other hand, if the upper surface of the end of the paper 31 is not located at the paper-feedable position (if the determination in step S37 is No), in step S38, the controller 100 causes the timer 106 to measure the elapsed period from the time at which the paper upper surface detection is changed to be off, and sets the tray control state from the "standby" state to the "lift waiting" state (step S38).

Thereafter, the processing returns to the determination in step S4.

Next, a description will be made on an example of lift-up error processing for the paper feed tray 18 in the digital multifunction peripheral 1 according to the first embodiment of the present disclosure with reference to FIG. 12 and FIG. 13.

Figure 12:
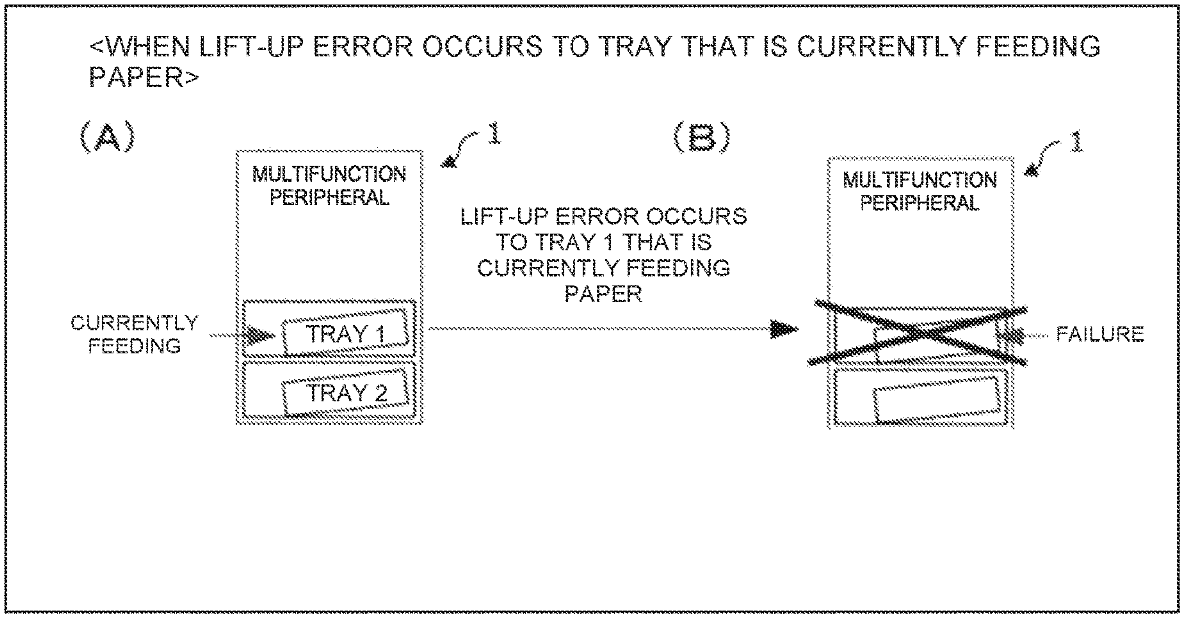
FIG. 12 is an explanatory view illustrating an example of lift-up error processing for the paper feed tray that is currently feeding the paper in the digital multifunction peripheral according to the first embodiment of the present disclosure.

FIG. 12 is an explanatory view illustrating an example of the lift-up error processing for the paper feed tray 18 that is currently feeding the paper in the digital multifunction peripheral 1 according to the first embodiment of the present disclosure.

Figure 13:
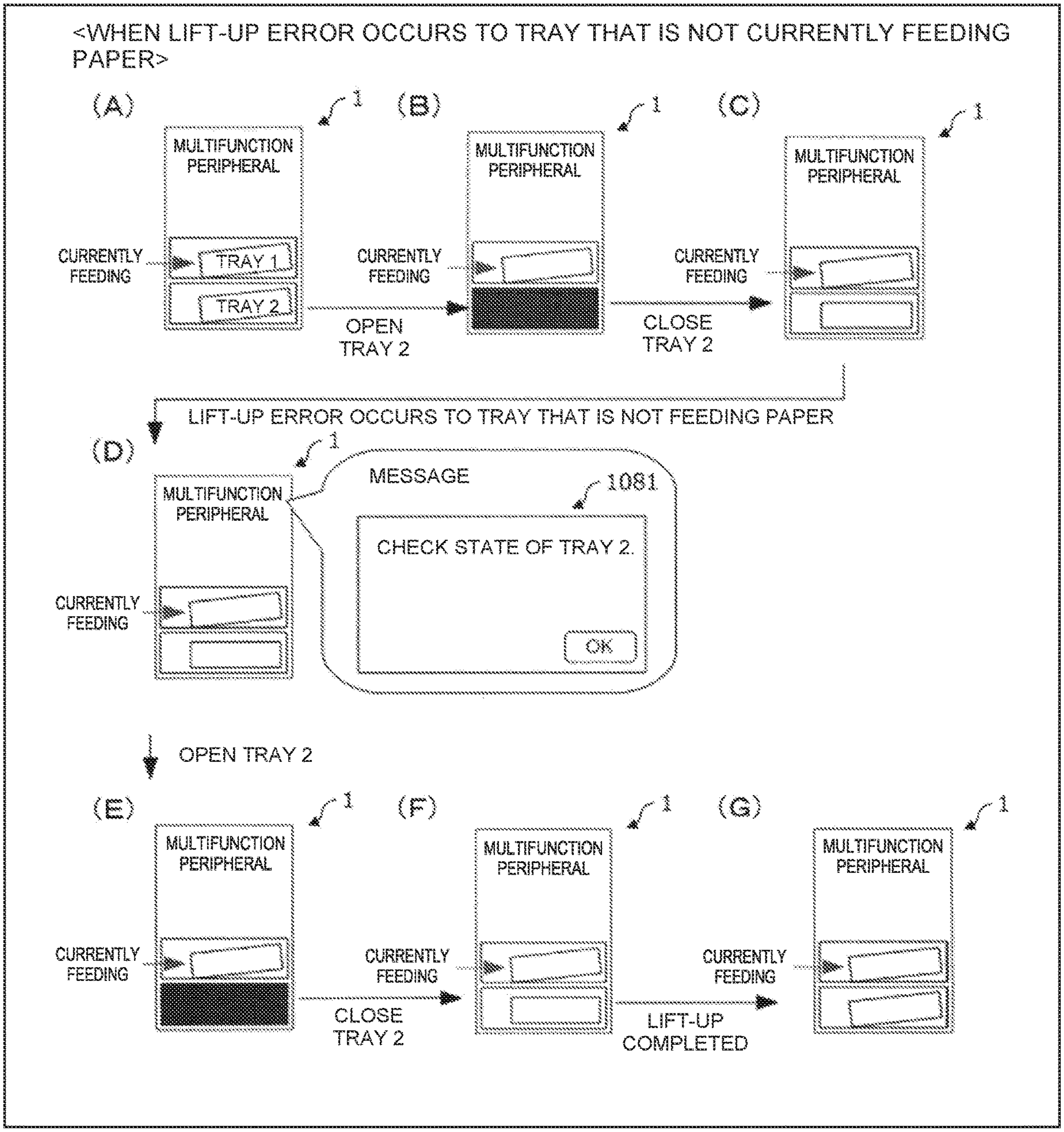
FIG. 13 is an explanatory view illustrating an example of the lift-up error processing for the paper feed tray that is not feeding the paper in the digital multifunction peripheral according to the first embodiment of the present disclosure.

FIG. 13 is an explanatory view illustrating an example of the lift-up error processing for the paper feed tray 18 that is not feeding the paper in the digital multifunction peripheral 1 according to the first embodiment of the present disclosure.

In the examples illustrated in FIG. 12 and FIG. 13, for convenience of description, it is assumed that the digital multifunction peripheral 1 includes the two paper feed trays 18 (the tray 1 and the tray 2) and that only the tray 1 is currently feeding the paper.

In the case where the lift-up error occurs to the tray 1 while only the tray 1 in the digital multifunction peripheral 1 is currently feeding the paper as illustrated in FIG. 12(A), as illustrated in FIG. 12(B), it is determined that the tray 1 fails.

In this case, since the tray 1 is in the failed state, the display 1081 shows a message that the tray 1 has to be repaired.

Meanwhile, as illustrated in FIGS. 13(A) to (C), it is assumed that, in the case where only the tray 1 in the digital multifunction peripheral 1 is currently feeding the paper, the lift-up error occurs to the tray 2 when the user opens the tray 2, which is not feeding the paper, refills the tray 2 with the paper 31, and then closes the tray 2.

In this case, as illustrated in FIG. 13(D), the display 1081 shows an error message that "CHECK STATE OF TRAY 2".

Then, as illustrated in FIGS. 13(E) to (G), when the user opens the tray 2 to improve the storage state of the paper 31 and then closes the tray 2 again, the lift-up error is resolved, and the lift-up is completed.

On the other hand, in the case where the lift-up error is not resolved even after the user retries to improve the storage state of the paper 31 by opening the tray 2 three or more times, it is determined that the tray 2 fails.

In this case, since the tray 2 is in the failed state, the display 1081 shows a message that the tray 2 has to be repaired.

Just as described, in the case where the paper upper surface detector 203 no longer detects that the one end of the paper 31 is lifted up to the paper-feedable position in the paper feed tray 18 that is currently feeding the paper, it is determined that the paper feed tray 18 fails, and the user is notified that the paper feed tray 18 has to be repaired. Meanwhile, in the case where, after the opening and closing detector 201 detects that the paper feed tray 18 is brought into the closed state from the open state, the paper upper surface detector 203 does not detect that the one end of the paper 31 is lifted up to the paper-feedable position in the paper feed tray 18, the user is notified to open the paper feed tray 18 and check the storage state of the paper 31. In this way, it is possible to provide the digital multifunction peripheral 1 capable of executing the appropriate error handling processing according to the situation at the time when the error occurs to the paper feed tray 18.

Preferred aspects of the present disclosure also include one in which some of the above-described plural aspects are combined. Various modified examples of the present disclosure can be implemented in addition to the above-described embodiment. Such modified examples should not be construed not to fall within the scope of the present disclosure. The present disclosure is embodied by the claims and their equivalents, and should embrace all modifications within the scope of the claims.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An image forming apparatus comprising:

a paper feeder that feeds at least one paper for image formation;

an image forming device that forms an image on the at least one paper based on image data when accepting a print command of the image data from a user;

a display that shows a predetermined message for the user; and a controller that controls the paper feeder, the image forming device, and the display, wherein the paper feeder includes:

a paper feed tray that is openable and closable, and that stores the at least one paper, a lifting drive device that lifts a lift plate loaded with the at least one paper, and an opening and closing detector that detects an open or closed state of the paper feed tray, when determining that an abnormality, that an upper surface of an end of the at least one paper does not reach a paper-feedable position within a predetermined time after the at least one paper starts being lifted up by the lifting drive device, occurs to the paper feed tray in a case that the paper feeder is in a paper-feeding state for the image forming device to form the image, the controller determines that the abnormality is caused by a failure of the paper feeder, and executes a predetermined first abnormality processing, when determining that the abnormality occurs to the paper feed tray in a case that the opening and closing detector detects that the paper feed tray is brought into the closed state from the open state, the controller determines that the abnormality is caused by a storage failure of the at least one paper stored in the paper feed tray, and executes a predetermined second abnormality processing, as part of the first abnormality processing, the controller causes the display to show a message indicating that the paper feed tray has to be repaired, as part of the second abnormality processing, the controller causes the display to show a message indicating that a storage state of the at least one paper stored in the paper feed tray has to be checked, and a display of the message related to the first abnormality processing is prioritized over a display of the message related to the second abnormality processing.

2. The image forming apparatus according to claim 1, wherein the paper feeder further includes a paper upper surface detector for detecting that the upper surface of the end of the at least one paper is lifted up to the paper-feedable position, as a condition that the paper upper surface detector does not detect that the upper surface of the end of the at least one paper is lifted up to the paper-feedable position in the paper feed tray, the controller executes the first abnormality processing, and as a condition that:

the opening and closing detector detects that the paper feed tray is brought into the closed state from the open state, the controller causes the lifting drive device to lift up the end of the at least one paper that is stored in the paper feed tray, and the paper upper surface detector does not detect that the upper surface of the end of the at least one paper is lifted up to the paper-feedable position within the predetermined time after the at least one paper starts being lifted up by the lifting drive device, the controller executes the second abnormality processing.

* * * * *